US009787772B2

(12) United States Patent
Holden et al.

(10) Patent No.: US 9,787,772 B2
(45) Date of Patent: Oct. 10, 2017

(54) POLICY BASED ALERTS FOR NETWORKED STORAGE SYSTEMS

(71) Applicant: NETAPP, INC., Sunnyvale, CA (US)

(72) Inventors: James Stephen Holden, Concord, MA (US); Shanmugavel Ponnusamy, Waltham, MA (US); Jason Sprague, Westford, MA (US); Francisco Jose Assis Rosa, Sudbury, MA (US)

(73) Assignee: NETAPP, INC., Sunnyvale, CA (US)

( * ) Notice: Subject to any disclaimer, the term of this patent is extended or adjusted under 35 U.S.C. 154(b) by 91 days.

(21) Appl. No.: 14/716,548

(22) Filed: May 19, 2015

(65) Prior Publication Data

US 2016/0344596 A1 Nov. 24, 2016

(51) Int. Cl.
G06F 15/16 (2006.01)
H04L 29/08 (2006.01)
G06F 3/06 (2006.01)
G06F 9/455 (2006.01)
H04L 12/24 (2006.01)

(52) U.S. Cl.
CPC ............ *H04L 67/1097* (2013.01); *G06F 3/06* (2013.01); *G06F 9/45533* (2013.01); *H04L 41/0893* (2013.01); *H04L 41/0609* (2013.01)

(58) Field of Classification Search
USPC ........................................................ 709/219
See application file for complete search history.

(56) References Cited

U.S. PATENT DOCUMENTS 6,721,789 B1 4/2004 DeMoney
8,019,965 B2 9/2011 Agombar et al.
8,452,856 B1 5/2013 Lent et al.
8,458,138 B1 6/2013 Sirianni et al.
8,812,806 B2 8/2014 Fredricksen et al.
9,152,642 B2 10/2015 Harrison et al.
9,569,367 B1 2/2017 Wigmore et al.
9,639,277 B2 5/2017 Nakajima
2004/0098383 A1* 5/2004 Tabellion ............ G06F 17/3007

(Continued)

FOREIGN PATENT DOCUMENTS

WO WO2012/058169 5/2012

OTHER PUBLICATIONS

Notice of Allowance on related (U.S. Appl. No. 13/905,920) dated Jun. 1, 2015.

(Continued)

*Primary Examiner* — Vivek Srivastava
*Assistant Examiner* — Hermon Asres
(74) *Attorney, Agent, or Firm* — Klein, O'Neill & Singh, LLP

(57) ABSTRACT

Methods and systems for a storage system are provided. The methods include maintaining a logical object associated with a resource of a storage system by a management console; creating a first policy associated with the logical object; selecting an annotation category associated with the logical object and assigning a value to the annotation category, where the annotation category defines an attribute associated with the logical object; providing a duration for generating an alert when the first policy is violated; assigning a threshold value for first policy violation; and setting an indicator for foregoing an alert associated with a second policy, when the first policy is violated.

19 Claims, 14 Drawing Sheets

(56) References Cited

U.S. PATENT DOCUMENTS

| | | |
|---|---|---|
| 2008/0208926 A1* | 8/2008 | Smoot ............... G06F 17/30306 |
| 2008/0222375 A1 | 9/2008 | Kotsovinos et al. |
| 2008/0288948 A1 | 11/2008 | Attarde et al. |
| 2009/0125962 A1 | 5/2009 | Colosky, Jr. et al. |
| 2009/0259791 A1 | 10/2009 | Mizuno et al. |
| 2010/0332401 A1 | 12/2010 | Prahlad et al. |
| 2011/0022812 A1 | 1/2011 | van der Linden et al. |
| 2011/0225359 A1 | 9/2011 | Kulkarni et al. |
| 2011/0231604 A1 | 9/2011 | Taguchi et al. |
| 2011/0264805 A1 | 10/2011 | Breitgand et al. |
| 2012/0239859 A1 | 9/2012 | Lary et al. |
| 2012/0317155 A1* | 12/2012 | Ogasawara ....... G06F 17/30589 707/812 |
| 2013/0212345 A1 | 8/2013 | Nakajima |
| 2014/0337061 A1* | 11/2014 | Olson ................... G06Q 40/08 705/4 |

OTHER PUBLICATIONS

International Search Report and Written Opinion on co-pending PCT application (PCT/US2014/038730) from International Searching Authority (EPO) dated Aug. 13, 2014.
Non-Final Office Action on co-pending (U.S. Appl. No. 14/587,504) dated May 19, 2017.
Notice of Allowance on co-pending U.S. Appl. No. 14/587,504 dated Aug. 10, 2017.

* cited by examiner

| | 166A | 166B | 166C |
|---|---|---|---|
| | Alias | Alternative name for the storage array. | Storage |
| | Birthday | The date the device was turned on. | Host, Storage, Switch, Tape, Volume |
| | Building | The building the device resides in. | Host, Storage, Switch, Tape |
| | City | The city the device is located in. | Host, Storage, Switch, Tape |
| | Compute_Resource | A group of compute resources sharing the same user account and password. | Host, Virtual machine |
| | Continent | The continent the device is on. | Host, Storage, Switch, Tape |
| | Country | The country the device is in. | Host, Storage, Switch, Tape |
| | Data_Center | The data center the device is located in. | Host, Storage, Switch, Tape |
| | Direct_Attached | If the device is direct attached or not. | Storage |
| | End_of_Life | The date this device will be decommissioned | Host, Storage, Switch, Tape, Volume |
| | Fabric_Alias | The alternative name for the fabric. | Switch |
| | Floor | The floor in the data center the device is on. | Host, Storage, Switch, Tape |
| | Hot | If the device is above a utilization level derived by the end user. | Storage, Switch, Taoe |
| | Note | A comment field for notes regarding the objects. | Data Source, DR Violation, Host, Internal Volume, Port, Qtree, Quota, Reservation Violation, Share, Storage, Storage Pool, Switch, Tape, Violation, Virtual Machine, Volume |
| | Rack | The rack name the device is in. | Host, Storage, Switch, Tape |
| | Room | The room name the device is in. | Host, Storage, Switch, Tape |
| | SAN | SAN means storage area network | Host, Storage, Switch, Tape |
| | Service_Level | The name of a level of service prescribed for that object | Internal Volume, Qtree, Volume |
| | State_Province | The state or province the device is located in. | Host, Storage, Switch, Tape |
| | Sunset | The date at which migration off this device should start | Host, Storage, Switch, Tape, Volume |
| | Switch_Level | Switch_Level means | Switch |
| | Tier | A grouping of the hardware type | Internal Volume, Qtree, Storage, Storage Pool, Volume |
| | Violation Severity | Either a warning or critical event | DR Violation, Reservation Violation, Violation |

Violation by Policies

191A

Violation History

191B

Violation Table

POLICY BASED ALERTS FOR NETWORKED STORAGE SYSTEMS

TECHNICAL FIELD

The present disclosure relates to networked storage system and more particularly, to policy and threshold management in networked storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Networked storage systems are used extensively in NAS, SAN and virtual environments. The infrastructure for such storage systems use various components, for example, switches, storage devices and others. To effectively manage the infrastructure i.e., a large number of logical objects that represent the storage infrastructure components' are maintained. These logical objects are associated with numerous counters and data associated with counters is collected periodically. A storage administrator can become overwhelmed if all the data associated with the various objects/counters is provided. Continuous efforts are being made to efficiently monitor information in networked storage systems and providing information to users that is helpful and desirable based on a user's operating environment and needs.

SUMMARY

In one aspect, a machine implemented method is provided. The method includes maintaining a logical object associated with a resource of a storage system by a management console; creating a first policy associated with the logical object; selecting an annotation category associated with the logical object and assigning a value to the annotation category, where the annotation category defines an attribute associated with the logical object; providing a duration for generating an alert when the first policy is violated; assigning a threshold value for first policy violation; and setting an indicator for foregoing an alert associated with a second policy, when the first policy is violated.

In another aspect, a non-transitory, machine-readable storage medium having stored thereon instructions for performing a method is provided. The storage medium includes machine executable code which when executed by at least one machine, causes the machine to: maintain a logical object associated with a resource of a storage system by a management console; create a first policy associated with the logical object; select an annotation category associated with the logical object and assigning a value to the annotation category, where the annotation category defines an attribute associated with the logical object; provide a duration for generating an alert when the first policy is violated; assign a threshold value for first policy violation; and set an indicator for foregoing an alert associated with a second policy, when the first policy is violated.

In yet another aspect, a system having a memory containing machine readable medium comprising machine executable code having stored thereon instructions is provided. A processor module of a management console coupled to the memory executes the machine executable code to: maintain a logical object associated with a resource of a storage system by the management console; create a first policy associated with the logical object; select an annotation category associated with the logical object and assigning a value to the annotation category, where the annotation category defines an attribute associated with the logical object; provide a duration for generating an alert when the first policy is violated; assign a threshold value for first policy violation; and set an indicator for foregoing an alert associated with a second policy, when the first policy is violated.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures:

FIG. 1G shows an example of various annotation categories for a plurality of objects maintained by the management system, according to one aspect of the present disclosure;

FIG. 1J shows an example of displaying violations by policy and FIG. 1K shows an example of a GUI screenshot with violation history and other details, according to one aspect of the present disclosure;

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for a storage system are provided. The method includes maintaining a logical object associated with a resource of a storage system by a management console; creating a first policy associated with the logical object; selecting an annotation category associated with the logical object and assigning a value to the annotation category, where the annotation category defines an attribute associated with the logical object; providing a duration for generating an alert when the first policy is violated; assigning a threshold value for first policy violation; and setting an indicator for foregoing an alert associated with a second policy, when the first policy is violated.

Figure 1A:
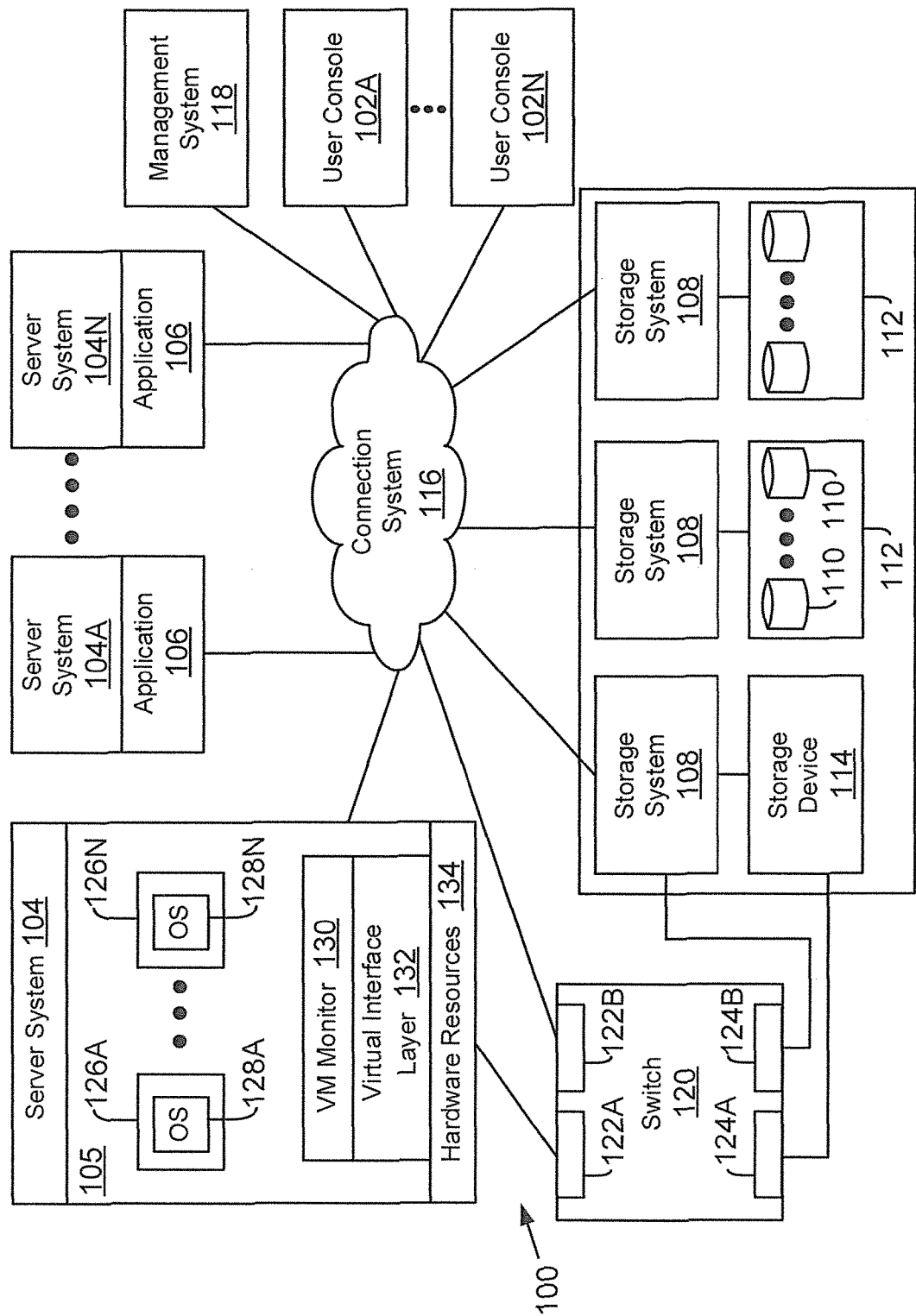
FIG. 1A shows an example of an operating environment for the various aspects disclosed herein.

System 100:

FIG. 1A shows an example of an operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles 102A-102N.

In one aspect, in a SAN environment, one or more switch 120 may be used for communication between server systems 104 and storage device(s) 114. Switch 120 may include a plurality of ports, for example, 122A-122B and 124A-124B having logic and circuitry for handling network packets. Ports 122A-122B may be connected directly to server system 104 or via connection system 116. Ports 124A-124B may be connected to storage device 114 and storage system 108.

Server systems 104 may be computing devices configured to execute applications 106 over a variety of operating systems, including the UNIX® and Microsoft Windows® operating systems. Application 106 may utilize data services of storage system 108 to access, store, and manage data in a set of storage devices 110/114 that are described below in detail. Application 106 may include an email exchange application, a database application or any other type of application. In another aspect, application 106 may comprise a virtual machine as described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126A execute a plurality of guest OS 128A-128N (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128a-128n. The VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110 and 114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Details regarding management system 118 are provided below in more detail.

System 100 may also include one or more user consoles 102A-102N referred to as users. Users' 102A-102n may access server system 104 for storage related services provided by storage system 108 and also use management system 118 for obtaining management related services described below in detail.

In one aspect, storage system 108 has access to a set of mass storage devices 110 (may be referred to as storage devices 110) within a storage subsystem 112. Storage system 108 may also access storage devices 114 via switch 120 that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110 are used by storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The aspects disclosed herein are not limited to any particular storage device or storage device configuration.

In one aspect, to facilitate access to storage devices 110, a storage operating system of storage system 108 "virtualizes" the storage space provided by storage devices 110/114. The storage system 108 can present or export data stored at storage devices 110 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 114 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate N-("network") module and D-(disk) module, described below in detail with respect to FIG. 2A. Briefly, the N-module is used to communicate with host platform server system 104 and management system 118, while the D-module is used to communicate with the storage devices 110 that are a part of a storage sub-system.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be kept as unique identifiers.

Because storage system 108 services read and write requests, it maintains information regarding the number of I/O operations that are processed within a time unit, for example, a second, referred to herein as "IOPS" by the storage device and by each storage volume. Storage system 108 is also aware of the identity of the sever systems that generate the I/O requests. Storage system 108 also maintains information on a rate at which information is transferred (also referred to as a throughput rate) from the storage devices. The throughput rate is maintained for each storage volume of the storages devices.

The VMs 126A-126n, applications 106 and clients 102 may use resources within system 100, for example, storage devices 110/114. In some instances, the resources may become undesirably over utilized. An administrator of system 100 may want to be alerted when a resource usage has reached a threshold level. However, the infrastructure of system 100 has numerous components and tracking all the components and providing all the data to the administrator may be overwhelming for the administrator. The management system 118 provides an efficient system described below where the administrator is able to create a policy for a specific object/component annotate the policy based on the selected object and then define an alerting mechanism related to the policy, as described below in detail.

Figure 1B:
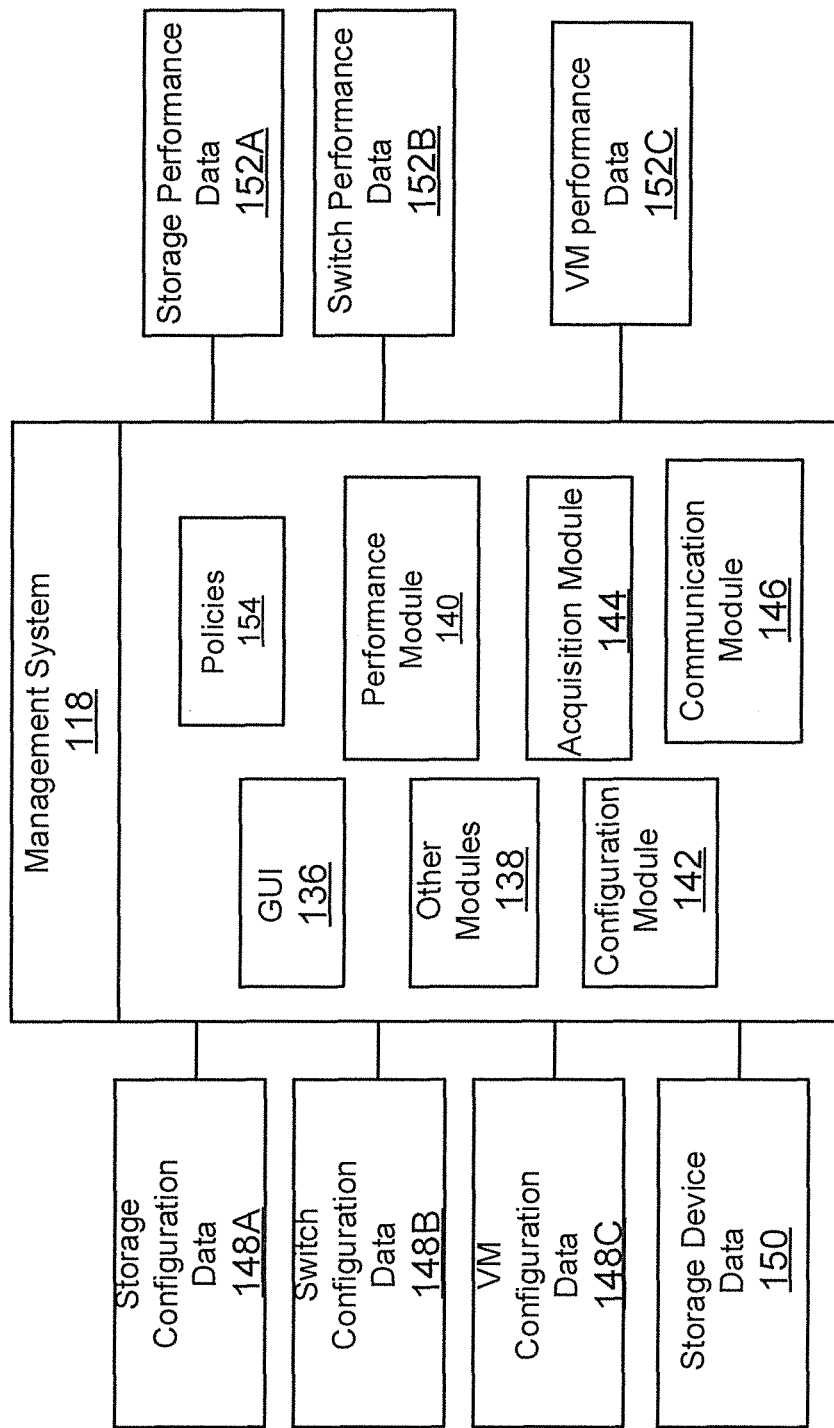
FIG. 1B shows an example of a management system, according to one aspect of the present disclosure.

Management System 118:

FIG. 1B shows a block diagram of management system 118 having a plurality of modules and using a plurality of data structures, according to one aspect. The various modules may be implemented in one computing system or in a distributed environment among multiple computing systems. In the illustrated aspect, the management system 118 may include a graphical user interface (GUI) module 136 to generate a GUI for use by a storage administrator or a user using a user console 102. In another aspect, management system 118 may present a command line interface (CLI) to a user. The GUI may be used by a user to set policies for receiving alerts related to resource performance in system 100, as described below in detail.

Management system 118 may include a communication module 146 that implements one or more conventional communication protocols and/or APIs to enable the various modules of management system 118 to communicate with the storage system 108, VMs 126A-126N, switch 120, server system 104 and clients 102.

Management system 118 maintains information regarding storage device 110 and 114 at a storage device data structure 150 that stores a name of a storage device manufacturer, a storage device identifier, a maximum number of LOPS that the device can handle and a throughput rate that the storage device is able to support. This information may be hard-coded and stored at a memory storage location.

In one aspect, management system 118 also includes an acquisition module 144 that obtains information regarding storage devices 110/114 from storage system 108 and switch 120. Acquisition module 144 may send a discovery request to storage system 108 and switch 120 seeking storage device 110/114 and switch 120 information, respectively. The format and structure of the discovery request will depend on the protocol/standard used by acquisition module 144 to communicate with storage system 108 and switch 120.

The information may include an amount of data that is transferred to and from a storage device within a certain duration, a number of LOPS that are serviced by a storage device, the identity of the server systems (also referred to as host systems) that use the storage devices, transfer rates of the switch ports and other information as described below.

Management system 118 also includes a processor executable configuration module 142 that stores configuration information for storage devices 110/114 and switch 120. The configuration information may be stored as data structures 148A-148C.

Management system 118 maintains storage configuration data 148A, switch configuration data 148B and VM configuration data 148C, according to one aspect. The actual data for data structures 148A-148C may be acquired by acquisition module 144 from storage systems 108, switch 120 and VMM 130, respectively.

Storage configuration data 148A identifies the storage system 108 that manages a storage device, the storage volumes associated with the storage device and the identity of users (for example, server systems 104) that access the storage volumes. Storage configuration data 148A may be obtained from storage system 108.

Switch configuration data 148B identifies switch 120, the various ports of switch 120 and the identity of the devices/computing systems that are coupled to switch 120. Switch configuration data 148B is acquired by acquisition module 144 either directly from switch 120 or any other entity, according to one aspect.

VM configuration data 148C identifies the VMM 130, for example, the hypervisor that presents and controls VMs 126A-126N. VM configuration data 148C also identifies the various VMs and the resources that are used by the VMs at any given time, for example, VHDs. VM configuration data 148C may also be acquired by acquisition module 144 from VMM 130 and storage system 108.

Management system 118 includes a performance module 140 that receives performance data regarding storage devices 110/114 and switch 120. The performance data may be stored as storage performance data 152A, switch performance data 152B and VM performance data 152C. The storage performance data 152A shows if a storage device is over utilized at a given time, the number of TOPS within certain duration, a throughput within the certain duration and other information.

Switch performance data 152B includes performance of ports 122A-122D. For example, switch performance data 152B may show the data transfer rates for one or more of switch ports 122A-122D. The switch data may be used to ascertain which of the connected hosts may be causing over utilization of a storage device, as described below in more detail.

VM performance data 152C includes information regarding the various VMs, identity of the virtual disks used by the VMs and other information that is described below in more detail. It is noteworthy that the various data structures described above, namely, 148A-148C and 152A-152C may be integrated into a single data structure that is accessible to one or more modules of management system 118.

Management system 118 may also include other modules 138. The other modules 138 are not described in detail because the details are not germane to the inventive aspects.

Figure 1C:
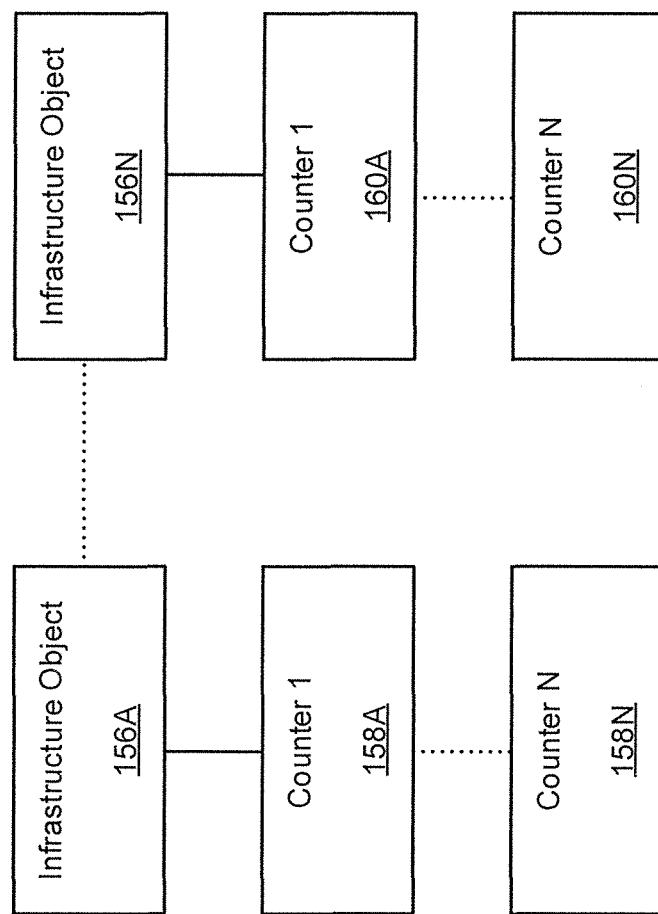
FIG. 1C shows an example of a plurality of infrastructure objects that are managed by the management system of FIG. 1B, according to one aspect of the present disclosure.

FIG. 1C shows an example of how performance data is maintained and collected for various resources, according to one aspect. The various resources of system 100 are represented logically as infrastructure objects 156A-156N (maybe referred to as objects 156). Data associated with the resources is collected using counters shown as 158A-158N and 160A-160N. If all counter data is presented to an administrator, the administrator will have an overwhelming amount of information. The processes described herein allow the administrator to assign policies for generating system alerts. Based on the policies, as described below in detail certain counter information is collected and then alerts are based on the collected information.

Figure 1D:
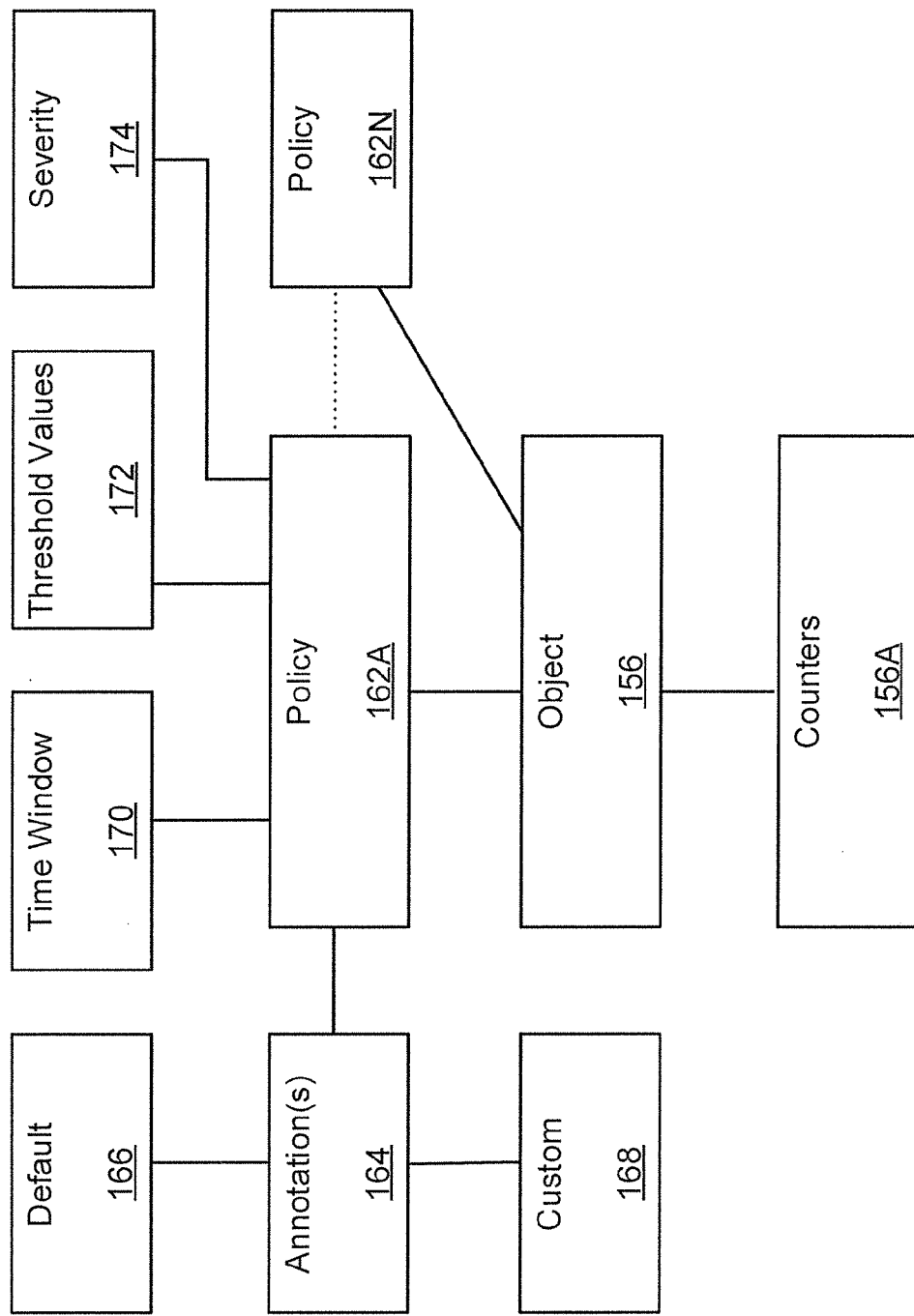
FIG. 1D shows a format for generating policy based alerts, according to one aspect of the present disclosure

FIG. 1D shows an example of how a policy associated with an infrastructure object 156 may be used to define user preferred alerts, according to one aspect of the present disclosure. Infrastructure object 156 may be associated with one or more policies 162A-162N. Each policy has certain annotations 164. Some of the annotations are default annotations 166 and others may be defined or customized by the user. Details of using annotations 164 are provided below.

A time window 170 is also associated with policy 162A. The time window 170 provides a duration before an alert is generated based on certain defined threshold values 172. The threshold values 172 are assigned to certain parameters for generating alerts, as described below in detail. Severity 174 defines the importance of an alert, for example, an alert may be critical, or it may only be a warning.

Based on the policy 162A, counters 156A are used to collect the appropriate data. In one aspect, counters 156A are fewer than all the infrastructure counters that have been described above with respect to FIG. 1C. Thus, the policy based alert system is more efficient in using the resources of management system 118 and other system 100 components', as described below in detail.

Figure 1E:
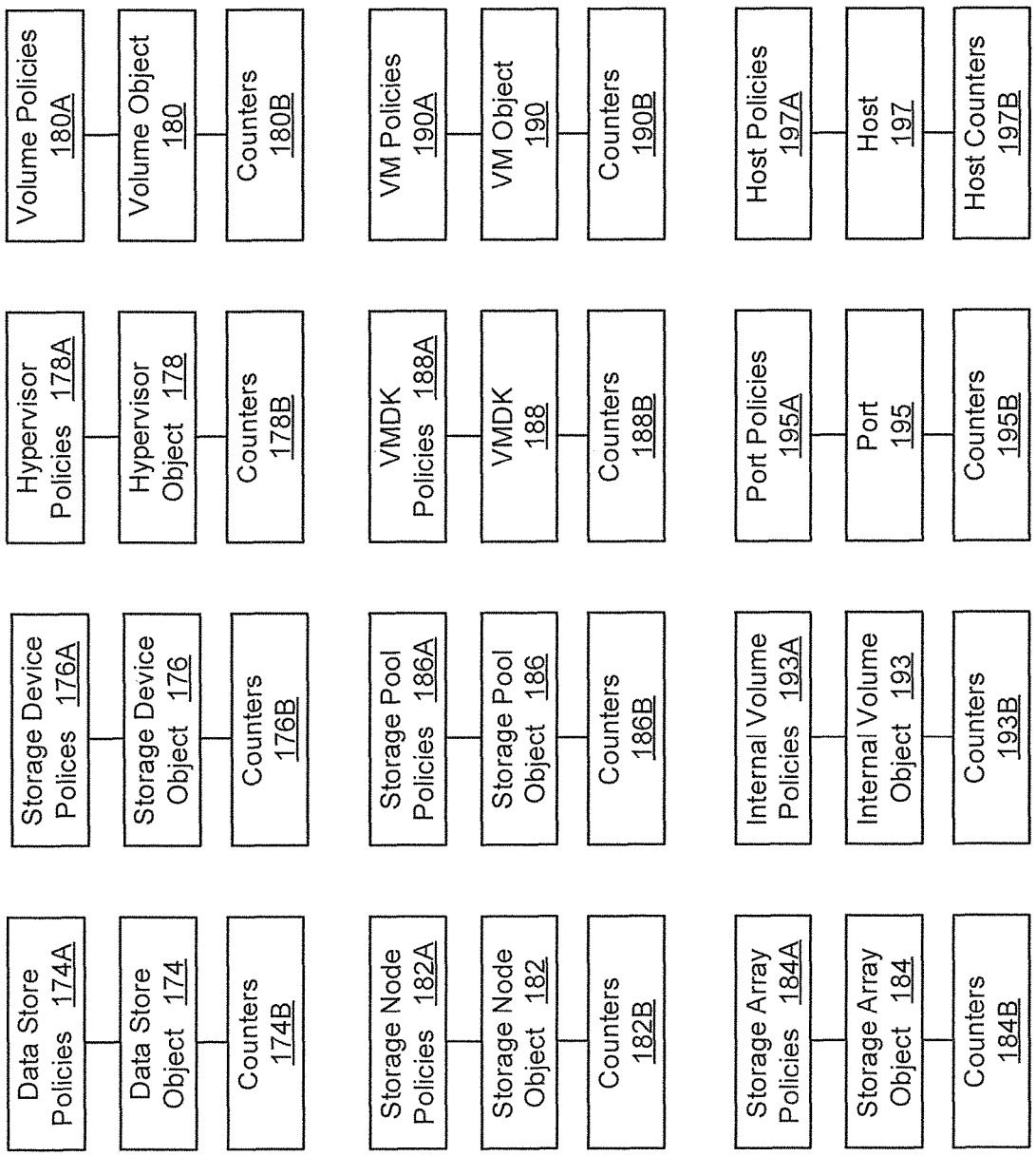
FIG. 1E shows an example of a plurality of objects with associated policies, managed according to one aspect of the present disclosure.

FIG. 1E shows an example of various infrastructure objects, according to one aspect. For example, infrastructure objects include a data store object 174 with associated data store policies 174A and counters 174B. The data store object 174 is used to track a plurality of virtual disks (VMDKs) that may be used within a VM for storing information. The data store policies 174A are used to select annotations associated with the data store object 174.

Infrastructure objects may include a storage device object 176 with storage device policies 176A and counters 176B. The storage device object 176 is used for tracking attributes of different storage devices using counters 176B. The storage device policies 176A are used to select annotations associated with the storage device object 176.

Infrastructure objects may include a hypervisor (or VMM) object 178) object with policies 178A and counters 178B. The hypervisor object 178 is used for tracking attributes of the hypervisor using counters 178B. The hypervisor policies 178A are used to select annotations associated with the hypervisor object 178.

Infrastructure objects may include a volume object 180 with policies 180A and counters 180B. The volume object 180 is used for tracking attributes of a volume using counters 180B. Policies 180A are used to select annotations associated with the volume object 180. The volume object 180 represents a volume that is presented to a host system for storing data.

Infrastructure objects include a storage node object 182 with policies 182A and counters 182B. The storage node object 182 is used for tracking attributes of a storage node using counters 182B. Policies 182A are used to select annotations associated with the storage node object 182.

Infrastructure objects include storage object (may also be referred to as storage array object) 184 with policies 184A and counters 184B. The storage object 184 is used for tracking attributes of a storage array using counters 184B. Policies 184A are used to select annotations associated with the storage object 184.

Infrastructure objects include a storage pool object 186A with policies 186A and counters 186B. The storage pool object 186 is used for tracking attributes of a storage pool (for example, an aggregate having a plurality of storage devices) using counters 186B. Policies 186A are used to select annotations associated with the storage pool object 186.

Infrastructure objects include a virtual disk object (VMDK) 188 with policies 188A and counters 188B. The volume object 188 is used for tracking attributes of a VMDK using counters 188B. Policies 188A are used to select annotations associated with the VMDK object 188.

Infrastructure objects include a virtual machine object 190 with policies 190A and counters 190B. The virtual machine object 190 is used for tracking attributes of a VM using counters 190B. Policies 190A are used to select annotations associated with object 190.

Infrastructure objects include an internal volume object 193 with policies 193A and counters 193B. The internal volume object 193 is used for tracking attributes of an internal volume using counters 193B. Policies 193A are used to select annotations associated with object 193. An internal volume is a logical representation of storage as maintained by a storage operating system.

Infrastructure objects further includes a switch port object 195 with associated policies 195A and counters 195B. The ports are used to receive and send information. Policies 195A are used to select annotations associated with object 195.

Infrastructure objects further includes a host system object 197 with associated policies 197A and counters 197B. The host object 197 is used to represent host computing systems, for example, 104. Policies 197A are used to select annotations associated with object 197.

Table I below shows an example of various counters associated with the infrastructure objects of FIG. 1E that are maintained by the management 118, according to one aspect. The Column Labelled "Object" identifies the infrastructure objects of FIG. 1E. The second column shows the "Counter" associated with the infrastructure object. The third column shows the unit associated with the performance data. For example, the unit MBS means, megabytes per second, KBS means kilobytes per second, LOPS means number of I/O (i.e. read and/or write) operations per second, and the other units that are self-explanatory. The fourth column provides a description of the performance data that is being collected for an object/counter. As one can see, if all the counter data of Table I were to be exposed to a user, the user will be overwhelmed with all the information. The adaptive aspects described herein provide a mechanism for using annotations for specific policies to present information.

TABLE I

| Object | Counter(s) | Unit | Description |
|---|---|---|---|
| VOLUME 180 | Read; Write, Total and Maximum Throughput | MBS | Total data transfer for read operations, write operations, read and write and maximum data read and written for the object |
| VOLUME 180 | Read, Write; Total and Maximum Latency | MILLISECONDS | The latency of read operations; write operations; read and write operations and maximum latency for the object |
| VOLUME 180 | Read, Write, Total, Maximum IOPS | IOPS | The number of read; write; read and write and maximum number of read and write request per second |
| VOLUME 180 | Total pending write requests | NONE | The number of write requests that are pending at any given time |
| VOLUME 180 | Read; Write; Total Cache Hit Ratio | PERCENTAGE | The percentage of read; write requests and total requests served by a cache of a storage system node |
| VOLUME 180 | Total Partial Blocks Ratio | PERCENTAGE | The percentage of blocks not fully written or read by a node |
| VIRTUAL_MACHINE 190 | Read; Write; Total; and Maximum Disk Throughput | MBS | Total data read; written; read and written; and maximum data read and written for the VM object |
| VIRTUAL_MACHINE 190 | Read; Write; Total; and Maximum Disk Latency | MILLISECONDS | Latency of read; write; read and write; and maximum read and write operations for the VM object |
| VIRTUAL_MACHINE 190 | Read; Write; Total; and Maximum Disk IOPS | IOPS | The number of read; write; read and write requests; and a maximum of read and write requests per second |

TABLE I-continued

| Object | Counter(s) | Unit | Description |
|---|---|---|---|
| VIRTUAL_MACHINE 190 | Total CPU; and Memory Utilization | PERCENTAGE | The VM CPU; and memory utilization |
| VIRTUAL_MACHINE 190 | Incoming Swap; and Outgoing Swap Rate | KBS | Amount of data swapped between memory and disk for the VM |
| VIRTUAL_DISK 188 | Read; Write; Total; and Maximum Throughput | MBS | Total data read; written; read and written; and maximum data read and written to the object |
| VIRTUAL_DISK 188 | Read; Write; Total; and Maximum Latency | MILLISECONDS | Read; write; read and write operations and maximum latency for read and write operations |
| VIRTUAL_DISK 188 | Read; Write; Total and; Maximum IOPS | IOPS | The number of read; write; total; and maximum number of read and write requests per second |
| STORAGE_POOL 186 | Read; Write; Total and Maximum utilization | PERCENTAGE | The read; write; read and write and maximum utilization of disks in a storage pool |
| STORAGE_POOL 186 | Read; Write; Total and Maximum IOPS | IOPS | The number of read; write; read and write; and maximum read and write requests per second |
| STORAGE_POOL 186 | Read; Write; Total and Maximum Throughput | MBS | Total data read; written; read and written; maximum data read and written for the object |
| STORAGE_NODE 182 | Read; Write; Total and Maximum Throughput | MBS | Total data read; written; read and written and maximum data read and written for the object |
| STORAGE_NODE 182 | Read; Write; Total; and Maximum Latency | MILLISECONDS | Latency due to read; write; read and write and maximum read and write operations for the object |
| STORAGE_NODE 182 | Read; Write; Total and Maximum IOPS | IOPS | The number of read; write; read and write and maximum read and write requests per second |
| STORAGE_NODE 182 | Total Replaced Disk Reads | NONE | The number of disk reads replaced by cache |
| STORAGE_NODE 182 | Total and Maximum Utilization | PERCENTAGE | The total and maximum disk utilization of a storage node |
| STORAGE_NODE 182 | Total Port Utilization | PERCENTAGE | The total port utilization at the storage node |
| STORAGE_NODE 182 | Total Cache Hit Ratio | PERCENTAGE | Ratio of IO requests served by a cache for a node |
| STORAGE_NODE 182 | Total Port Errors | NONE | The number of port errors for a storage array |
| STORAGE_NODE 182 | Total Port Traffic | MBS | Total data read and written to the object |
| STORAGE ARRAY 182 | Read; Write; Total and Maximum Throughput | MBS | Total data read; written; read and written and maximum data read and written for the object |
| STORAGE ARRAY 184 | Read; Write; Total and Maximum Latency | MILLISECONDS | Latency of read; write; read and write operations; and maximum latency |
| STORAGE ARRAY 184 | Read; Write; Total and Maximum IOPS | IOPS | The number of read; write; read and write; and maximum read and write requests per second |
| STORAGE ARRAY 184 | Total pending write requests | NONE | The number of write requests queued for a storage array |
| STORAGE ARRAY 184 | Read; Write and Total Cache Hit Ratio | PERCENTAGE | The percentage of read; write; and total requests served by a cache |
| STORAGE ARRAY 184 | Total Partial Blocks Ratio | PERCENTAGE | The ratio of partially written blocks |
| STORAGE ARRAY 184 | Total Cache Utilization | PERCENTAGE | The cache utilization for a storage array |
| PORT 195 | Receive (Rx); Transmit (Tx) Traffic Utilization | PERCENTAGE | The percentage of possible receive and transmit traffic for a port |
| PORT 195 | Maximum Rx; Tx Traffic Utilization | PERCENTAGE | The maximum traffic received and transmitted during a time period. |
| PORT 195 | Sync Loss Port Errors | COUNT | Number of times synchronization has been lost. |

TABLE I-continued

| Object | Counter(s) | Unit | Description |
|---|---|---|---|
| PORT 195 | Signal Loss Port Errors | COUNT | Number of times a physical signal for a port has been lost. |
| PORT 195 | Frame Too Long; Too Short Port Errors | COUNT | Number of times received frames that were too long or short |
| PORT 195 | Tx Link; Rx Link Reset Port Errors | COUNT | Number of times a port link has been reset on transmit and receive |
| PORT 195 | Tx Discard Timeout Port Errors | COUNT | Number of transmit frames discarded by timeout. |
| PORT 195 | Link Failure Port Errors | COUNT | Number of times a link has failed. |
| PORT 195 | CRC Port Errors | COUNT | Number of times CRC has failed |
| PORT 195 | Total Port Errors | COUNT | Total port error count |
| PORT 195 | Rx; Tx Traffic | MBS | The rate of Rx and Tx traffic through a port |
| PORT 195 | Tx; Rx traffic rate | FRAME_SEC | Tx and Rx rate in frames per second |
| PORT 195 | Average Tx and Rx Frame Size | BYTES_FRAME | Average frame size on Tx and Rx traffic |
| HOST 197 | Read; Write; Total and Maximum Disk Throughput | MBS | Data read; written; read and written and maximum data read and written for the object |
| HOST 197 | Disk Read; Write Latency; Total and Maximum Latency | MILLISECONDS | Read; write; total and maximum latency for the object |
| HOST 197 | Disk Read; Write; Total and Maximum IOPS | IOPS | The number of read; write; total and maximum requests per second |
| HOST 197 | Total CPU; Memory Utilization | PERCENTAGE | The CPU and memory utilization of a host CPU |
| DISK 176 | Read; Write; Total and Maximum Throughput | MBS | Data read; written; read and written and maximum data read and written for the object |
| DISK 176 | Read; Write; Total and Maximum Utilization | PERCENTAGE | The read; write; total and maximum utilization of the disks |
| DISK 176 | Read; Write; Total and Maximum IOPS | IOPS | The number of read; write; total and maximum requests per second |
| DATA_STORE 174 | Read; Write; Total and Maximum Throughput | MBS | Data read; written; total and maximum data read and written for the object |
| DATA_STORE 174 | Read; Write; Total and Maximum Latency | MILLISECONDS | Read, write, total and maximum latency for the object |
| DATA_STORE 174 | Read; Write; Total and Maximum IOPS | IOPS | The number of read; write; total and maximum requests per second |

Figure 1F:
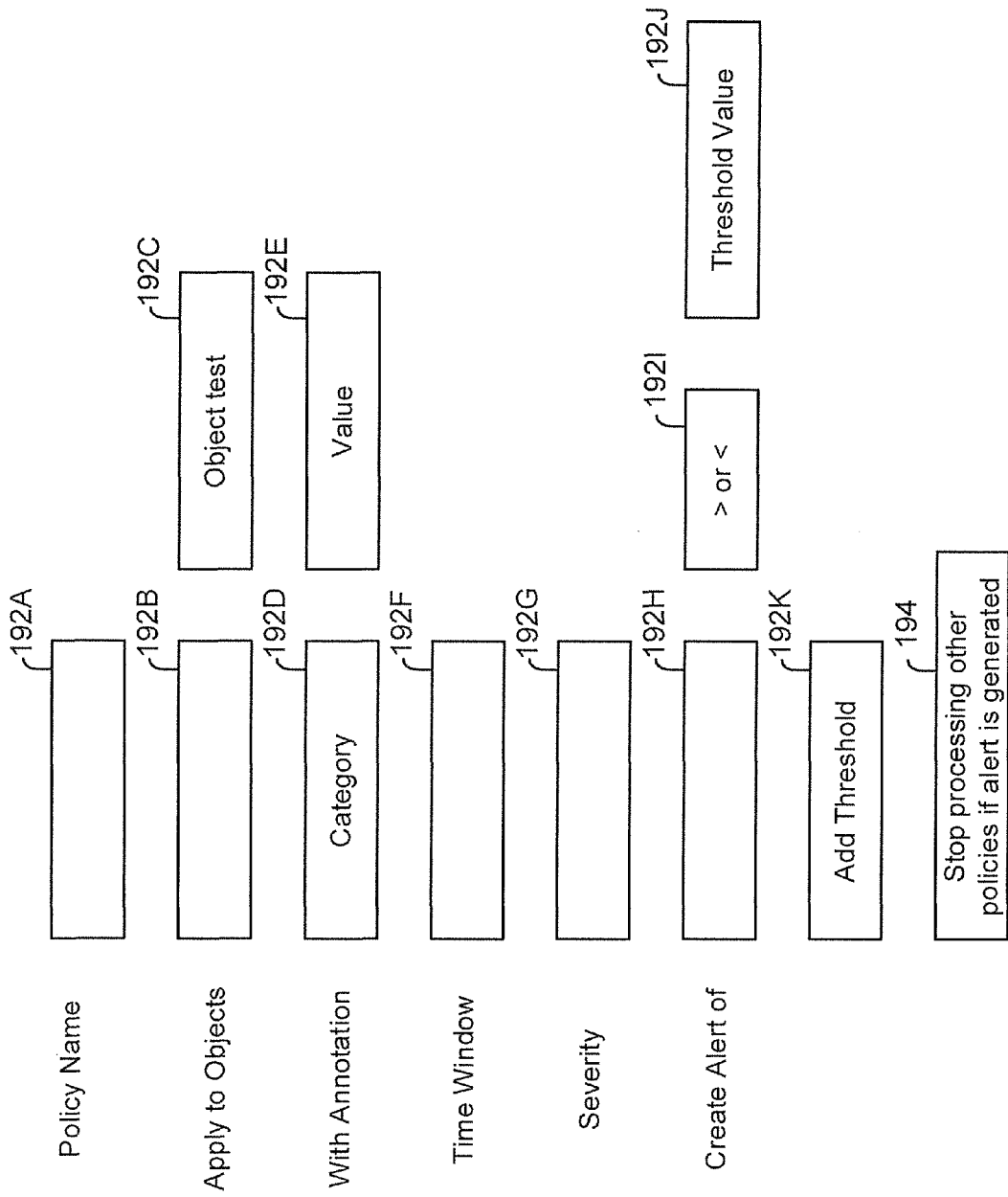
FIG. 1F shows an example of setting a policy for generating selective alerts, according to one aspect of the present disclosure.

FIG. 1F shows an example of a GUI 192 that is presented on a display device for defining a policy, according to one aspect. The GUI is presented on a display device of a computing device. A policy name 192A is assigned to the policy. The infrastructure object to which the policy is assigned is selected and shown as 192B. The object may be selected from an object list 192C that is maintained and updated by the management system 118. Examples of various objects are shown in FIG. 1E and described above.

An annotation category 192D is selected and a certain value 192E is assigned to the selected category. The time window 192F is also assigned a value to define a duration after which an alert can be generated. The severity 192G defines a severity level for the alert, when the policy is breached.

The alert is created based on a threshold parameter 192H and whether the parameter is greater than or less than (192I) than a threshold value 192J. A number of threshold parameters may be added to the policy (192K).

The GUI also provides a selection that disables alerts if the policy in 192A is violated. This essentially defines a priority for the policy.

FIG. 1G shows an example providing annotations 166 associated with various infrastructure objects that are maintained by the management system 118, according to one aspect. The default annotations 166 may be supplemented by custom annotations 168. The annotations 166 are used to refine and narrow the parameters that are used for generating alerts, as described below in detail.

As an example, column 166A lists an annotation type or category 166A. Column 166B provides a definition of the annotation category and is self-explanatory. Column 166C shows the various objects to which the annotations can be applied, for example, host system, storage, switch, storage device, storage pool, virtual machine, virtual machine volume and others.

Figure 1H:
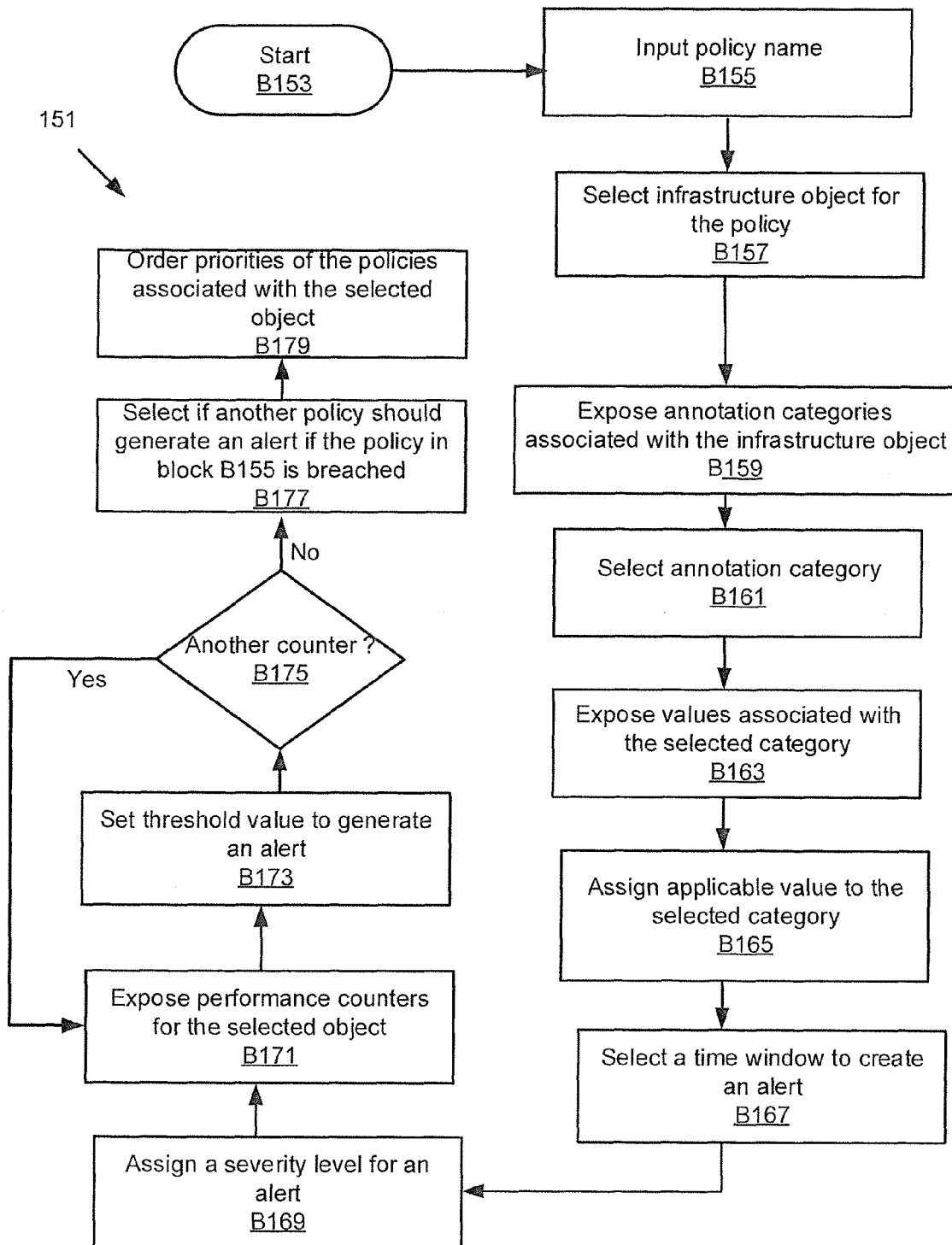
FIG. 1H shows a process for generating a policy, according to one aspect of the present disclosure.

Process Flow:

FIG. 1H shows a process flow 151, according to one aspect of the present disclosure. The process begins in block B151, when the management system 118, the storage system 108, host system 104 and switch 120 are initialized and operational. In one aspect, a user is presented with a GUI similar to the GUI 192 described above with respect to FIG. 1F. GUI 192 is provided so that a user can configure a policy for an infrastructure object to receive alerts associated with the infrastructure object.

In block B155, a unique policy name (for example, 192A) is input into GUI 192. The policy name is associated with an infrastructure object (192B) in block B157. As described above, management system 118 maintains logical infrastructure objects to manage various components, including a data store, a storage array, a storage device, a hypervisor, a volume, an internal volume, a storage node, a storage pool (for example, an aggregate), a virtual disk presented to a VM, a VM, a switch and others.

In block B159, the management system 118 exposes the various annotation categories that are available for the selected infrastructure object. An example of the various categories are shown in FIG. 1G and described above.

In block B161, an annotation category 192D is selected. Each category has an associated value 192E that is exposed in block B163. For example, if storage is selected as the infrastructure object and data center is selected as an annotation category, then the management system exposes all the values that are associated with data center. One of the values may be chosen as part of the policy.

In block B165, an applicable value is associated with the metadata for the policy.

In block B167, a time window is selected for creating an alert. The time window provides a minimal duration for data collection for the policy, before an alert is generated.

In block B169, a severity level is assigned to the alert. The severity levels may be customized and defined by a user of system 100.

In block B171, the appropriate performance counters are exposed on the GUI for the selected object. For example, the performance counters may be the number of input/output operations in a second (IOPS), ratio of read/write operations, disk utilization, switch port throughput or any other parameter as described above with respect to Table I.

A threshold value is then set for the counter in block B173. The threshold value may be set to be either greater than or less than a specific value or range of values, depending on the performance counter type.

In block B175, the process determines if there are any other remaining performance counters. If yes, the process moves back to block B171. Otherwise, in block B177, the GUI provides an option whether alerts associated with other policies for the same object selected in block B157 should be generated, in case the threshold value for this policy is reached. Based on the selection, in block B179, the priority of different policies associated with the object are ordered.

In one aspect, a user is able to define a policy for alerts and based on the policy and a selected annotation value, alerts are generated. This is efficient for the management system 118 because it only generates alerts based on specific parameters. This is also useful for the user because the user does not have to process or review counter data involving multiple objects, some of which may not have any relevance to the user's operating environment.

Figure 1I:
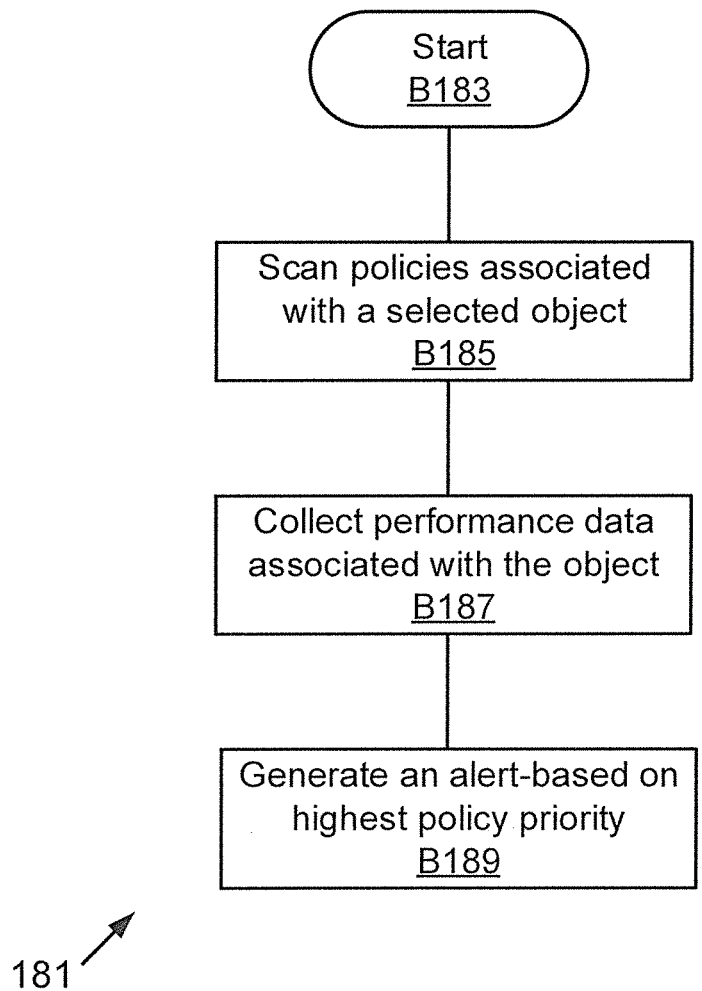
FIG. 1I shows a process for generating a policy based alert, according to one aspect of the present disclosure.

FIG. 1I shows a process 181 for using the policy created by the process 151, according to one aspect of the present disclosure. The process starts in block B183, when the process 151 has been executed and a policy has been created. The policy may be stored as a data structure (for example, 154, FIG. 1B) by the management system 118. In block B185, the performance module 140 scans the policies 154 for a selected object. In block B187, the performance module 140 collects performance data based on the priority of the policies for the selected object. In one aspect, the data is collected by the acquisition module 144 and provided to the performance module 140. Thereafter, in block B189, an alert is generated, based on the highest policy priority associated with the selected object.

Figure 1K:
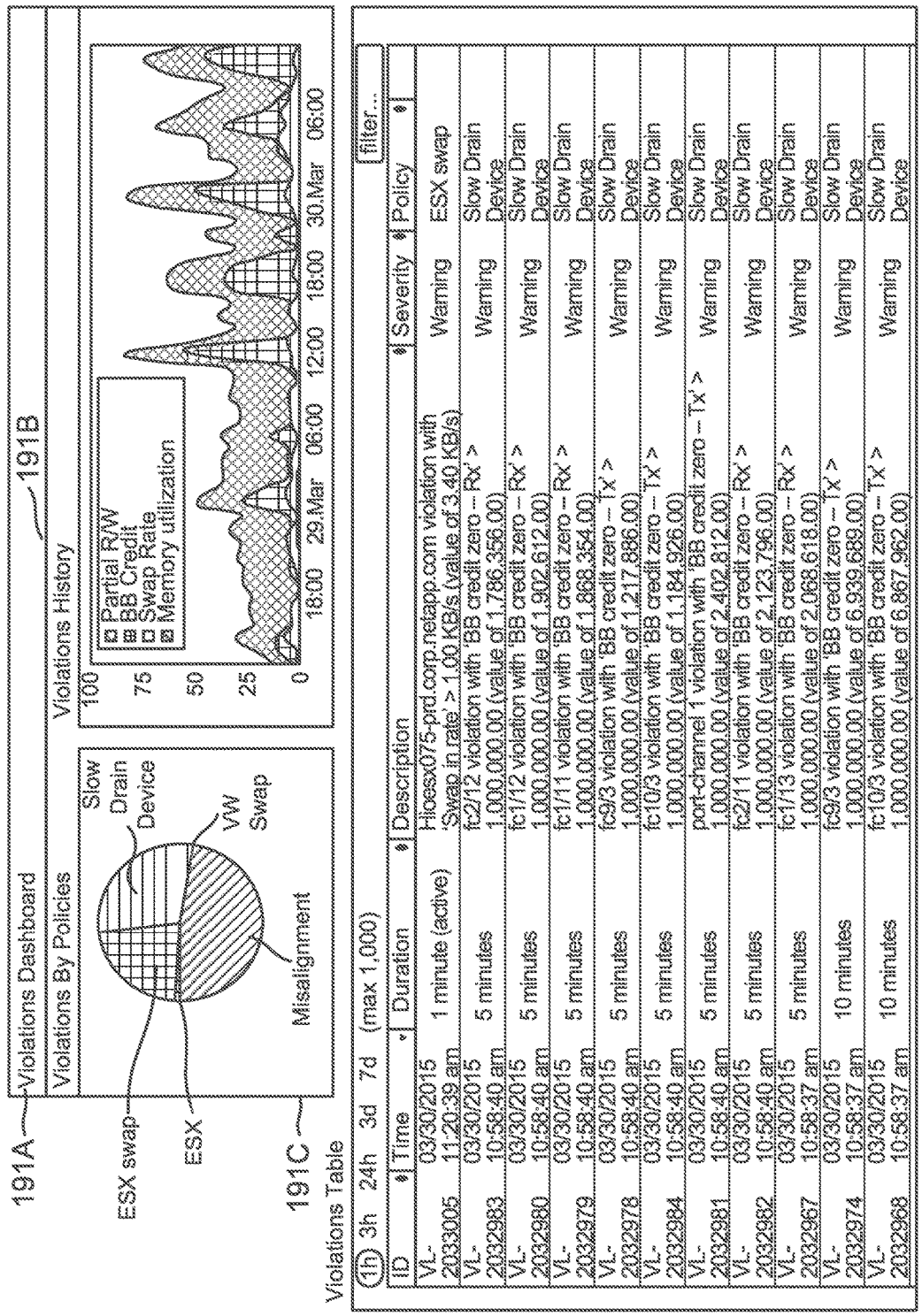

In one aspect, management system 118 maintains a history of violations by policy. The violations by individual policies is shown as 191A and the overall violation history is shown as 191B in FIG. 1J. A violation table 191C provides details regarding the violations. The violation history may be maintained as a data structure by the management system 118. An example of violations by policy/history is provided in the GUI screen shot of FIG. 1K. Violations by policy 191A show how different policies have been violated. The violation history provides a graphical representation of the violations over time. The violation table 193C provides violation details over time.

Figure 2A:
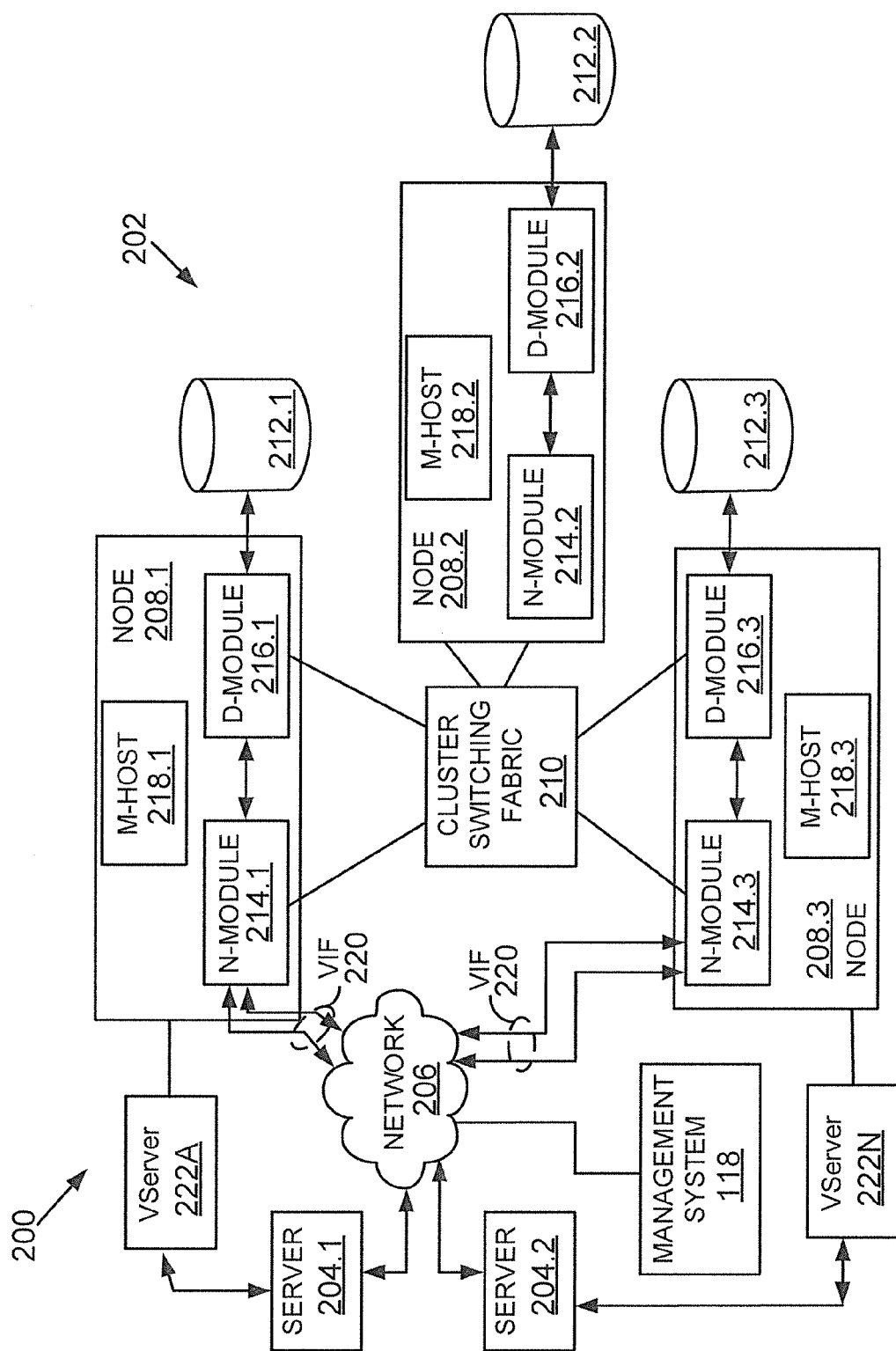
FIG. 2A shows an example of a clustered storage system, according to one aspect of the present disclosure.

Clustered Storage System:

FIG. 2A depicts an illustrative aspect of a storage environment 200 including a plurality of server systems 204.1-204.2 (similar to server systems 104), a clustered storage system 202 and at least one computer network 206 communicably connecting the server systems 204.1-204.2 and the clustered storage system 202. Management system 118 is used to collect and analyze information from various cluster nodes as described above in detail. In particular, storage performance data 152A, storage device data 150 and storage configuration data 148A may be obtained from the various cluster nodes.

As shown in FIG. 2A, the clustered storage system 202 includes a plurality of nodes 208.1-208.3, a cluster switching fabric 210, and a plurality of mass storage devices 212.1-212.3 (similar to 110/114, FIG. 1A).

Each of the plurality of nodes 208.1-208.3 is configured to include an N-module, a D-module, and an M-host, each of which can be implemented as a separate processor executable or machine implemented module. Specifically, node 208.1 includes an N-module 214.1, a D-module 216.1, and an M-host 218.1, node 208.2 includes an N-module 214.2, a D-module 216.2, and an M-host 218.2, and node 208.3 includes an N-module 214.3, a D-module 216.3, and an M-host 218.3.

The N-modules 214.1-214.3 include functionality that enables the respective nodes 208.1-208.3 to connect to one or more of the client systems 204.1-204.2 over the computer network 206, while the D-modules 216.1-216.3 connect to one or more of the storage devices 212.1-212.3.

The M-hosts 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the client systems 204.1-204.2, allowing storage 212.1-212.3 associated with the nodes 208.1-208.3 to be presented to the client systems 204.1-204.2 as a single shared storage pool.

For example, the switched virtualization layer may implement a virtual interface architecture. FIG. 2A depicts only the VIFs 220 at the interfaces to the N-modules 214.1, 214.3 for clarity of illustration.

The clustered storage system 202 can be organized into any suitable number of virtual servers (VServer) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a VServer is an instance of an application service provided to a client system. The nodes 208.1-208.3 are interconnected by the switching fabric 210, which, for example, may be embodied as a Gigabit Ethernet switch or any other switch type.

Although FIG. 2A depicts three N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
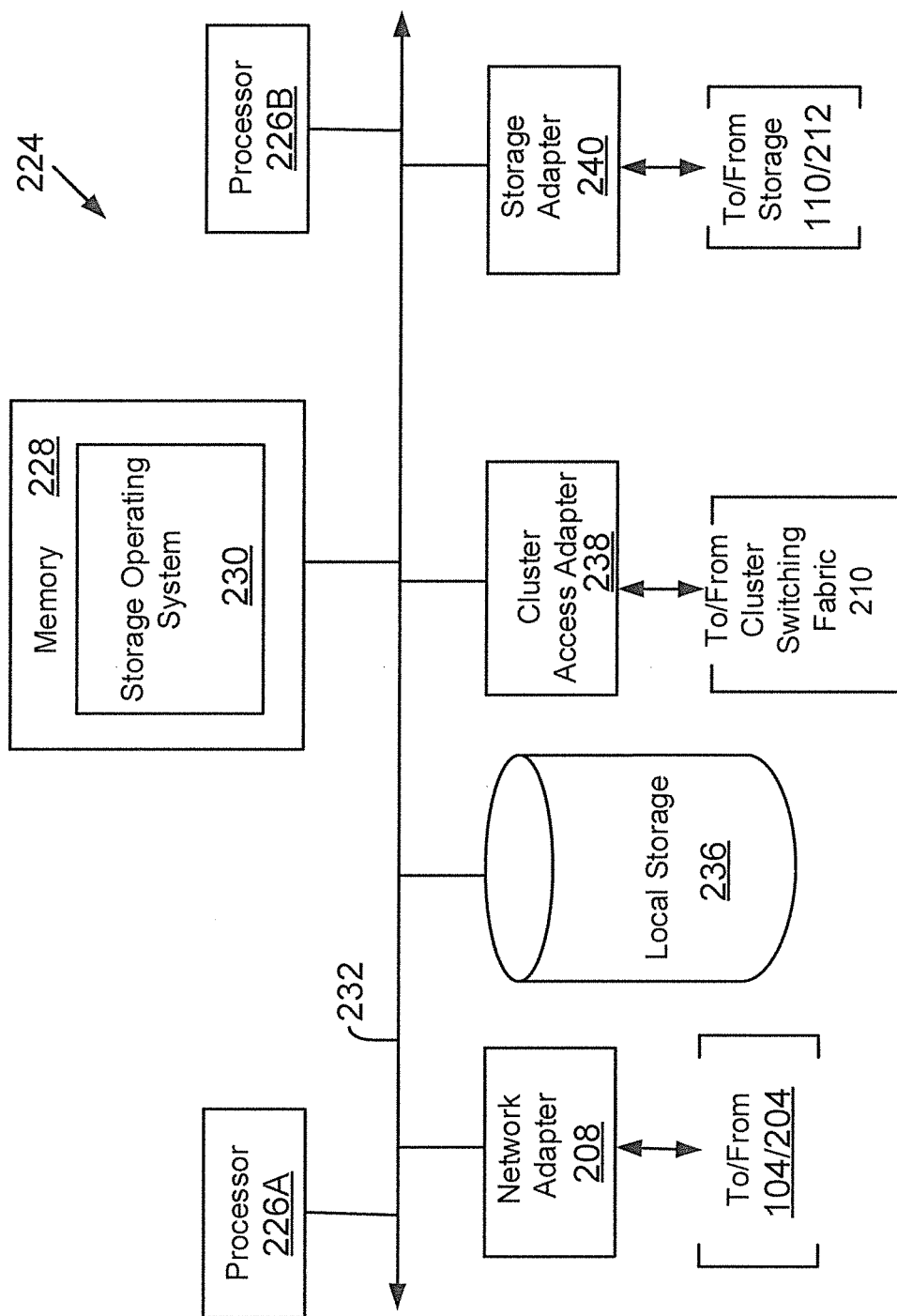
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of an N-module on a node, while the other processor 226B executes the functions of a D-module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
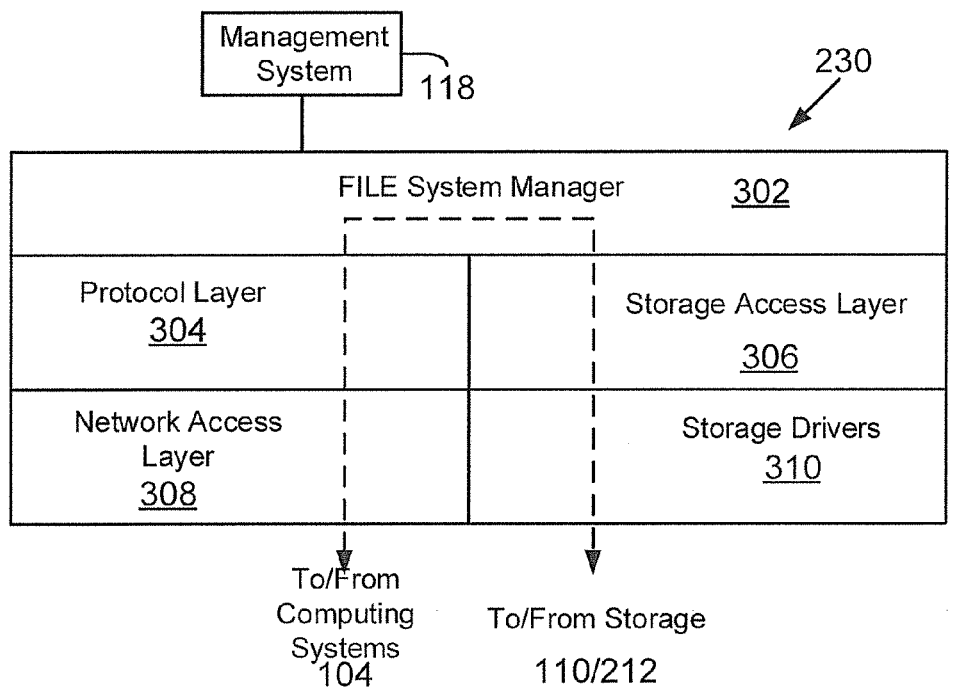
FIG. 3 shows an example of a storage operating system, used according to one aspect of the present disclosure.

Operating System:

FIG. 3 illustrates a generic example of operating system 230 executed by storage system 108, according to one aspect of the present disclosure. Storage operating system 230 interfaces with the management system 118 and provides information for the various data structures maintained by the management system 118, described above in detail.

As an example, operating system 230 may include several modules, or "layers". These layers include a file system manager 302 that keeps track of a directory structure (hierarchy) of the data stored in storage devices and manages read/write operations, i.e. executes read/write operations on disks in response to server system 104 requests.

Operating system 230 may also include a protocol layer 304 and an associated network access layer 308, to allow system 200 to communicate over a network with other systems, such as server system 104 and management system 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between server systems 104 and mass storage devices 110/114/212 are illustrated schematically as a path, which illustrates the flow of data through operating system 230.

The operating system 230 may also include a storage access layer 306 and an associated storage driver layer 310 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
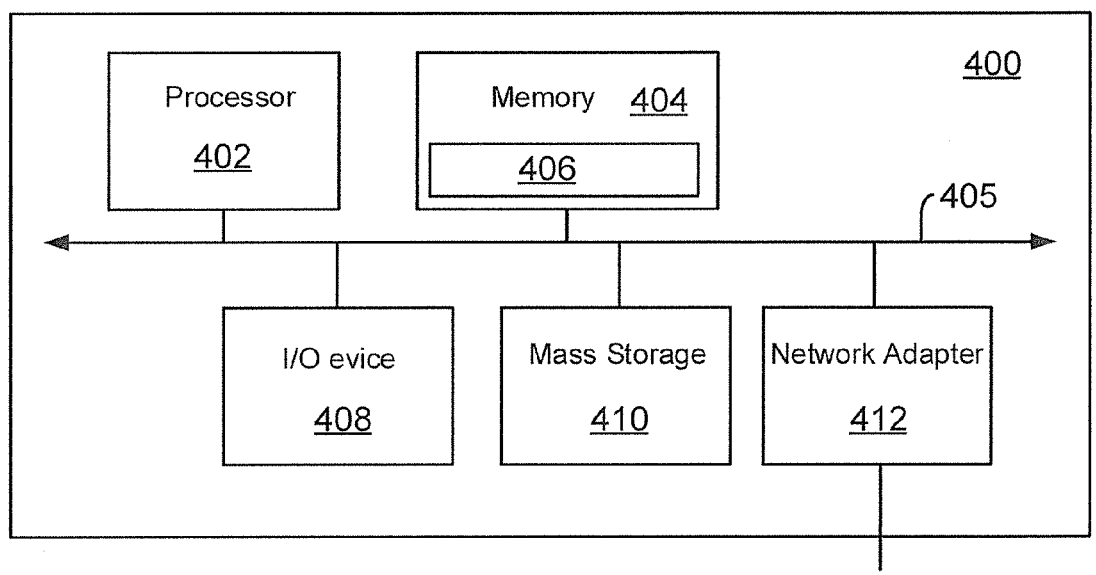
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by performance module 140, acquisition module 144, configuration module 142, GUI 136 as well as instructions for executing the process blocks of FIGS. 1H and 1I.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for managing resources within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising;
representing by a management console a plurality of resources of a networked storage system with a plurality of infrastructure objects, the plurality of resources used for storing and retrieving data at and from a plurality of storage devices, where each of the plurality of infrastructure objects is associated with a performance counter to monitor resource performance for executing client requests for storing and retrieving data;
selecting an infrastructure object from among the plurality of infrastructure objects, where the plurality of infrastructure objects are managed within a hierarchical structure by the management console;
creating a first policy associated with the selected infrastructure object;
presenting a plurality of selectable annotation categories for the selected infrastructure object, where different annotation categories are selectable for different infrastructure objects;
selecting an annotation category for the selected infrastructure object and assigning a value to the annotation category, where the annotation category uses a default annotation and a custom annotation for selectively generating an alert associated with the selected infrastructure object;
providing a duration for generating the alert when the first policy is violated;
assigning a threshold value for a counter tracking performance of a resource associated with the selected infrastructure object for triggering a first policy violation; and
setting an indicator for foregoing an alert associated with a second policy violation of a second policy associated with the selected infrastructure object, when the first policy is violated based on a counter value of the assigned counter.

2. The method of claim 1, wherein an alert is generated for the second policy violation, when the indicator to forego the alert is not set.

3. The method of claim 1, further comprising:
collecting performance data from the storage system associated with the selected infrastructure object and the selected annotation category; and
generating the alert when the first policy is violated based on the threshold value.

4. The method of claim 1, further comprising:
storing violation of the first policy in a data structure tracking historical policy violations.

5. The method of claim 1, wherein the logical selected infrastructure object represents one of a storage volume, a storage device, a storage array, a storage pool and a virtual machine.

6. The method of claim 5, wherein the storage system maintains a plurality of counters to track performance data for the selected infrastructure object and the management console obtains the performance data only associated with the first policy.

7. The method of claim 1, wherein the first policy is generated using a graphical user interface presented on a display device by the management console.

8. A non-transitory, machine-readable storage medium having stored thereon instructions for performing a method, comprising machine executable code which when executed by at least one machine, causes the machine to:
represent by a management console a plurality of resources of a networked storage system with a plurality of infrastructure objects, the plurality of resources used for storing and retrieving data at and from a plurality of storage devices, where each of the plurality of infrastructure objects is associated with a performance counter to monitor resource performance for executing client requests for storing and retrieving data;
select an infrastructure object from among the plurality of infrastructure objects, where the plurality of infrastructure objects are managed within a hierarchical structure by the management console;
create a first policy associated with the selected infrastructure object;
present a plurality of selectable annotation categories for the selected infrastructure object, where different annotation categories are selectable for different infrastructure objects;

select an annotation category for the selected infrastructure object and assigning a value to the annotation category, where the annotation category uses a default annotation and a custom annotation for selectively generating an alert associated with the selected infrastructure object;

provide a duration for generating the alert when the first policy is violated;

assign a threshold value for a counter tracking performance of a resource associated with the selected infrastructure object for triggering a first policy violation; and set an indicator for foregoing an alert associated with a second policy violation of a second policy associated with the selected infrastructure object, when the first policy is violated based on a counter value of the assigned counter.

9. The storage medium of claim 8, wherein an alert is generated for the second policy violation, when the indicator to forego the alert is not set.

10. The storage medium of claim 8, wherein the machine executable code further causes the machine to:

collect performance data from the storage system associated with the selected infrastructure object and the selected annotation category; and generate the alert when the first policy is violated based on the threshold value.

11. The storage medium of claim 8, wherein the machine executable code further causes the machine to:

store violation of the first policy in a data structure tracking historical policy violations.

12. The storage medium of claim 8, wherein the selected infrastructure object represents one of a storage volume, a storage device, a storage array, a storage pool and a virtual machine.

13. The storage medium of claim 12, wherein the storage system maintains a plurality of counters to track performance data for the selected infrastructure object and the management console obtains the performance data only associated with the first policy.

14. The storage medium of claim 8, wherein the first policy is generated using a graphical user interface presented on a display device by the management console.

15. A machine implemented method, comprising:

representing by a management console a plurality of resources of a networked storage system with a plurality of infrastructure objects, the plurality of resources used for storing and retrieving data at and from a plurality of storage devices, where each of the plurality of infrastructure objects is associated with a performance counter to monitor resource performance for executing client requests for storing and retrieving data;

selecting an infrastructure object from among the plurality of infrastructure objects, where the plurality of infrastructure objects are managed within a hierarchical structure by the management console;

creating a first policy associated with the selected infrastructure object;

presenting a plurality of selectable annotation categories for the selected infrastructure object, where different annotation categories are selectable for different infrastructure objects;

selecting an annotation category for the selected infrastructure object and assigning a value to the annotation category, where the annotation category uses a default annotation and a custom annotation for selectively generating an alert associated with the selected infrastructure object;

providing a duration for generating the alert when the first policy is violated;

assigning a threshold value for a counter tracking performance of a resource associated with the selected infrastructure object for triggering a first policy violation;

setting an indicator for foregoing an alert associated with a second policy violation of a second policy associated with the selected infrastructure object, when the first policy is violated based on a counter value of the assigned counter;

collecting performance data from the storage system associated with the selected infrastructure object and the selected annotation category;

generating the alert when the first policy is violated based on the threshold value without generating any alert for the second policy violation; and storing violation of the first policy in a data structure used for tracking historical policy violations.

16. The method of claim 15, wherein an alert is generated for the second policy violation, when the indicator to forego the alert is not set.

17. The method of claim 15, wherein the logical selected infrastructure object represents one of a storage volume, a storage device, a storage array, a storage pool and a virtual machine.

18. The method of claim 15, wherein the storage system maintains a plurality of counters to track performance data for the selected infrastructure object and the management console obtains the performance data only associated with the first policy.

19. The method of claim 15, wherein the first policy is generated using a graphical user interface presented on a display device by the management console.

* * * * *